Patented Apr. 24, 1951

2,550,489

UNITED STATES PATENT OFFICE 2,550,489

ULCER THERAPY COMPOSITION

Gustav J. Martin and Jack N. Moss, Philadelphia, Pa., assignors to The National Drug Company, Philadelphia, Pa., a corporation of Pennsylvania No Drawing. Application September 21, 1948, Serial No. 50,437

2 Claims. (Cl. 167—55)

This invention relates to new chemotherapeutic compositions particularly adapted for use in ulcer therapy.

The treatment of ulcers has been unavoidably complicated by the inability to determine precisely what causes this condition and how to counteract it. It is known, for example, that a high concentration of hydrochloric acid and also pepsin are contributing factors, as a result of which ulcer therapy in the past has stressed and in large part has been restricted to reduction of hyperacidity. It has been found that certain anion exchange resins, when reduced to very small particle size, exert a highly beneficial effect on the ulcer patient. Frequent doses of these resins, taken over extended periods of time, substantially reduce the acid and pepsin content of the stomach, thereby eliminating pain and benefiting the patient. These resins, however, do not possess the property of inhibiting the enzyme, lysozyme. Because this enzyme has a pronounced influence upon the ulcerous condition, the foregoing resins have not been completely effective in this treatment.

It is an object of the present invention to produce compositions which not only reduce the acid and pepsin content of the stomach, but also inhibit the enzyme, lysozyme. A further object is to make available new and improved compositions for the treatment of ulcers. Additional objects will become apparent from a consideration of the following description and claims.

These objects are attained in accordance with our invention, which is directed to compositions containing one or more hydrated aluminum silicates and certain anion exchange resins.

In accordance with our invention, we have found that a composition containing either bentonite or zeolite, and preferably a mixture of the two, and also containing anion exchange resins manufactured by The Resinous Products & Chemical Company and sold under the trade name "Amberlite," is surprisingly effective in the treatment of ulcers, since it controls not only the acid and pepsin content of the stomach but also the lysozyme content.

Bentonite is one of the hydrated aluminum silicates which is particularly adapted for use in our compositions. "Permutit" is another hydrated aluminum silicate particularly adapted for this purpose. As is well known, "Permutit" is a synthetic zeolite which is chemically a hydrated sodium aluminum silicate. The anion exchange resins which we employ in our compositions are described in U. S. Patent No. 2,402,384, issued to The Resinous Products & Chemical Company on June 18, 1946. They are formed by the condensation of a phenol, formaldehyde and an alkylene polyamine, the alkylene group of which may be interrupted by —NH— to form alkylene chains of at least two carbon atoms between nitrogen atoms. We prefer polyethylene polyaminomethylene substituted resins of diphenylol dimethyl methane and formaldehyde in basic form. These resins may be obtained by condensing phenol, formaldehyde and a polyethylene polyamine, followed by washing the condensate with a dilute, aqueous, alkaline solution.

While it is contemplated that our compositions may contain but a single hydrated aluminum silicate in admixture with the anion exchange resin, superior results are obtained by employing a mixture of hydrated aluminum silicates, preferably bentonite and "Permutit." The mixture of these compounds is advisably incorporated with the anion exchange resinous condensation product of phenol, formaldehyde and polyethylene polyamine.

The amounts of hydrated aluminum silicates and anion exchange resin employed in our compositions may vary within rather wide limits, for example, in parts by weight from about 1 to 10 parts of bentonite to from 5 to 50 parts of "Permutit" for 50 parts of anion exchange resin. We have found that a particularly effective composition contains 50 parts by weight of anion exchange resin, 50 parts by weight of "Permutit" and 5 parts by weight of bentonite.

Our compositions should be finely ground so that they pass through a 100-mesh screen, and preferably a finer screen, such as one as small as 200 mesh. This renders the composition much more effective and prevents nausea and gagging on the part of the patient.

The foregoing composition may be administered in the form of tablets, capsules, or powders, and if desired may be incorporated in suitable extenders, flavoring agents, etc. As a general rule, from ½ to 1 gram of the composition taken every two hours during the waking day is adequate, although of course, this dosage may be varied widely if desired by the physician.

Our compositions, as previously mentioned, have a profound effect upon the acid and pepsin content of the stomach, maintaining them at a satisfactory low level, with consequent relief and improvement in the patient. So far as the inhibition of the enzyme, lysozyme, is concerned, these compositions have the surprising effect of synergistically reducing the amount of this enzyme present in the stomach. For instance, amounts of bentonite, "Permutit" and anion exchange resin, which when taken alone are incapable of inhibiting the enzyme, lysozyme, when combined in the above-mentioned manner, inhibit the lytic action of this enzyme. Hence, these compositions are admirably adapted for the treatment of ulcers, since they not only possess the effectiveness of prior art compositions on hyperacidity and pepsin, but also control the lytic action of the enzyme, lysozyme. Since the latter is a critical factor in ulcer therapy, this effect is of profound importance.

As many apparently widely different embodiments of this invention may be made without departing from the spirit and scope hereof, it is to be understood that the invention is not limited to the specific embodiments hereof, except as defined in the appended claims.

We claim:

1. A composition particularly adapted for ulcer therapy comprising bentonite, hydrated sodium aluminum silicate and an anion exchange resinous condensation product of a polyalkylene polyamine, a phenol and formaldehyde.

2. A composition particularly adapted for ulcer therapy comprising by weight from 1 to 10 parts of bentonite, from 5 to 50 parts of hydrated sodium aluminum silicate and approximately 50 parts of an anion exchange resinous condensation product of a polyethylene polyamine, a phenol and formaldehyde.

GUSTAV J. MARTIN.
JACK N. MOSS.

REFERENCES CITED

The following references are of record in the file of this patent:

UNITED STATES PATENTS

| Number | Name | Date |
|---|---|---|
| 2,052,902 | Snyder | Sept. 1, 1936 |

OTHER REFERENCES

Martin: Gastroenterology, vol. 6, April 1946, pages 315 to 323.

Segal: Gastroenterology, vol. 4, June 1945, pages 484 to 496.

Becker: Chemical Abstracts, vol. 29, page 5518 (1935).

Pharmaceutical Abstracts (of the Journal of the American Pharmaceutical Association), vol. 9, page 130 (1943).

Drug and Cosmetic Industry, vol. 49, Oct. 1941, page 392.